US009872593B2

(12) United States Patent
Thomsen et al.

(10) Patent No.: US 9,872,593 B2
(45) Date of Patent: Jan. 23, 2018

(54) TIPPING ARRANGEMENT OF A MOVABLE CLEANING UNIT

(71) Applicant: NILFISK-ADVANCE A/S, Brondby (DK)

(72) Inventors: Henrik Thomsen, Terndrup (DK); Carl Olsen, Aars (DK); Henrik Jeppesen, Holte (DK); Richard Hickmott, Helsingor (DK); Alistair David Morton, Kastrup (DK)

(73) Assignee: NILFISK A/S (DK)

( * ) Notice: Subject to any disclaimer, the term of this patent is extended or adjusted under 35 U.S.C. 154(b) by 794 days.

(21) Appl. No.: 14/359,667

(22) PCT Filed: Nov. 20, 2012

(86) PCT No.: PCT/DK2012/000123
§ 371 (c)(1),
(2) Date: May 21, 2014

(87) PCT Pub. No.: WO2013/075715
PCT Pub. Date: May 30, 2013

(65) Prior Publication Data
US 2014/0332545 A1 Nov. 13, 2014

(30) Foreign Application Priority Data

Nov. 21, 2011 (DK) .................... 2011 00911

(51) Int. Cl.
*A47L 11/40* (2006.01)
*A47L 7/00* (2006.01)
(Continued)

(52) U.S. Cl.
CPC ............. *A47L 11/40* (2013.01); *A47L 7/0038* (2013.01); *A47L 11/30* (2013.01);
(Continued)

(58) Field of Classification Search
CPC ........ A47L 13/50; B65G 65/23; F16M 13/02; B62B 1/16; B62B 1/24; B62B 3/08; B62B 2203/70
(Continued)

(56) References Cited

U.S. PATENT DOCUMENTS 1,497,348 A * 6/1924 Reichmann ............... B60P 1/24
298/17.5
1,882,307 A * 10/1932 Venable .................... B62B 1/24
298/10
(Continued)

FOREIGN PATENT DOCUMENTS

BE 420210 A 3/1937
GB 675658 A 7/1952
GB 1260572 A 1/1972

OTHER PUBLICATIONS

International Search Report For PCT/DK2012/000123, dated Mar. 5, 2013, 2 pages.
(Continued)

*Primary Examiner* — Michael Jennings
(74) *Attorney, Agent, or Firm* — Ware, Fressola, Maguire & Barber LLP

(57) ABSTRACT

A tipping method for a tipping arrangement which includes a first element (1) and a second element (2), arranged between a moveable base unit (4) and a rotatable container (3). The container (3) is rotated by moving the second element (2) along a first track (7) on the first element (1). The second element (2) is moved along the track (7) by rotating the second element (2) relative to the first element (1). A number of engaging parts (9, 10) may be arranged on the tracks (7, 8) of the elements (1, 2), respectively. An interlocking arrangement may be arranged between the first element (1) and the second element (2) to secure the second element (2) in a starting position. A movable unit includes
(Continued)

the tipping arrangement and a section unit, with the container (3) locked in a vertical position by a locking arrangement.

12 Claims, 3 Drawing Sheets

(51) Int. Cl.
*A47L 11/30* (2006.01)
*B62B 3/08* (2006.01)

(52) U.S. Cl.
CPC ............ *A47L 11/4025* (2013.01); *B62B 3/08* (2013.01); *B62B 2203/70* (2013.01)

(58) Field of Classification Search
USPC .............................. 220/23.86; 414/419, 420
See application file for complete search history.

(56) References Cited

U.S. PATENT DOCUMENTS

| | | | | |
|---|---|---|---|---|
| 2,533,549 A * | 12/1950 | Bell | ........................... | B62B 1/24 180/19.3 |
| 2,677,575 A * | 5/1954 | Phillips | ..................... | B62B 1/24 24/598.4 |
| 2,860,797 A * | 11/1958 | Wilcox | ..................... | B66F 9/19 414/420 |
| 3,063,082 A | 11/1962 | Rosenberg | | |
| 3,160,439 A * | 12/1964 | Kazakowitz | .............. | B62B 1/24 298/17 B |
| 3,488,091 A * | 1/1970 | Baker | ....................... | B62B 1/20 280/47.31 |
| 3,613,924 A * | 10/1971 | Monson | .................... | B66F 9/19 414/420 |
| 4,940,335 A * | 7/1990 | Gibson | ................. | B01F 13/004 222/166 |
| 5,364,224 A * | 11/1994 | Padgett | ..................... | B66F 9/19 414/419 |
| 5,951,230 A * | 9/1999 | Kruzick | ................. | B65D 88/56 414/420 |
| 6,733,225 B1 * | 5/2004 | Barnett | ..................... | B66F 9/19 298/38 |
| 8,011,622 B1 * | 9/2011 | Guthrie | ................. | B65G 65/24 224/164 |
| 8,356,823 B1 * | 1/2013 | Berginc | ..................... | A47C 1/026 280/30 |
| 8,936,410 B2 * | 1/2015 | Genter | ..................... | B66F 9/19 403/322.3 |
| 2004/0061372 A1 * | 4/2004 | Messinger-Rapport | .. | B62B 1/24 298/3 |
| 2011/0064550 A1 * | 3/2011 | Genter | .................. | B65D 88/56 414/425 |

OTHER PUBLICATIONS

Danish Search Report for PA 2011 00911, dated Jun. 13, 2012, 2 pages.

* cited by examiner

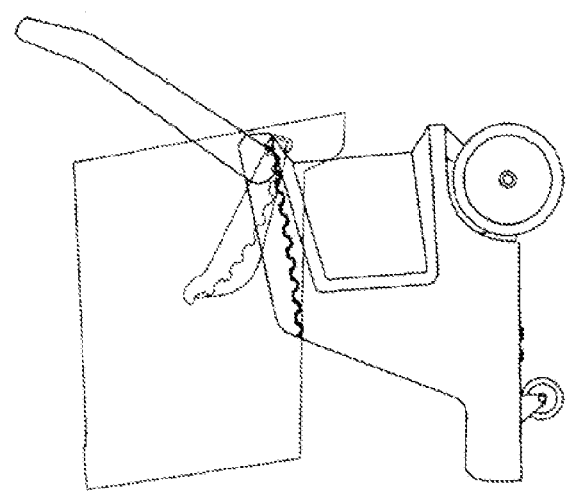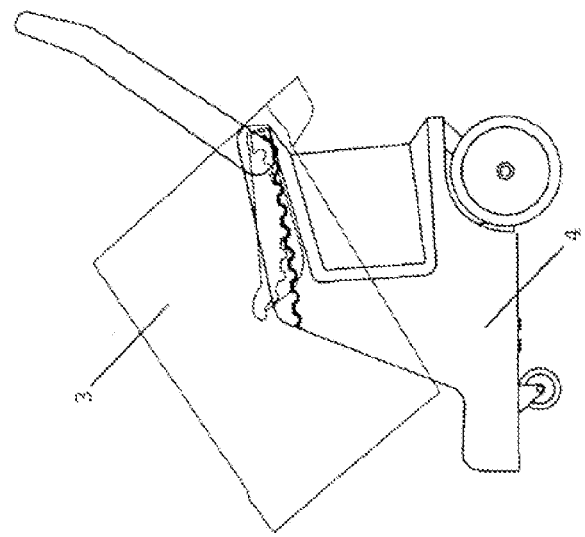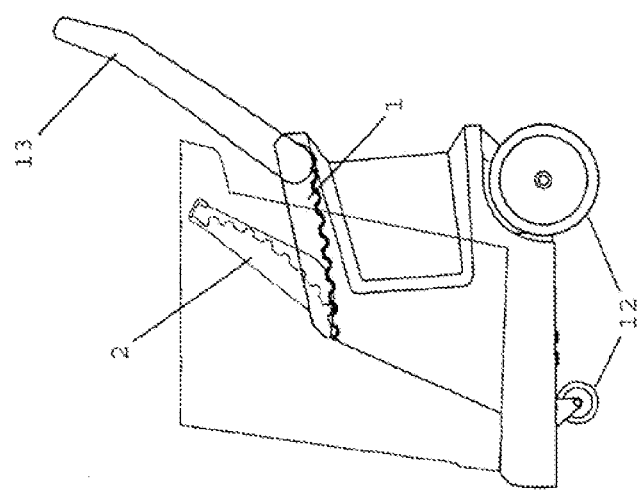

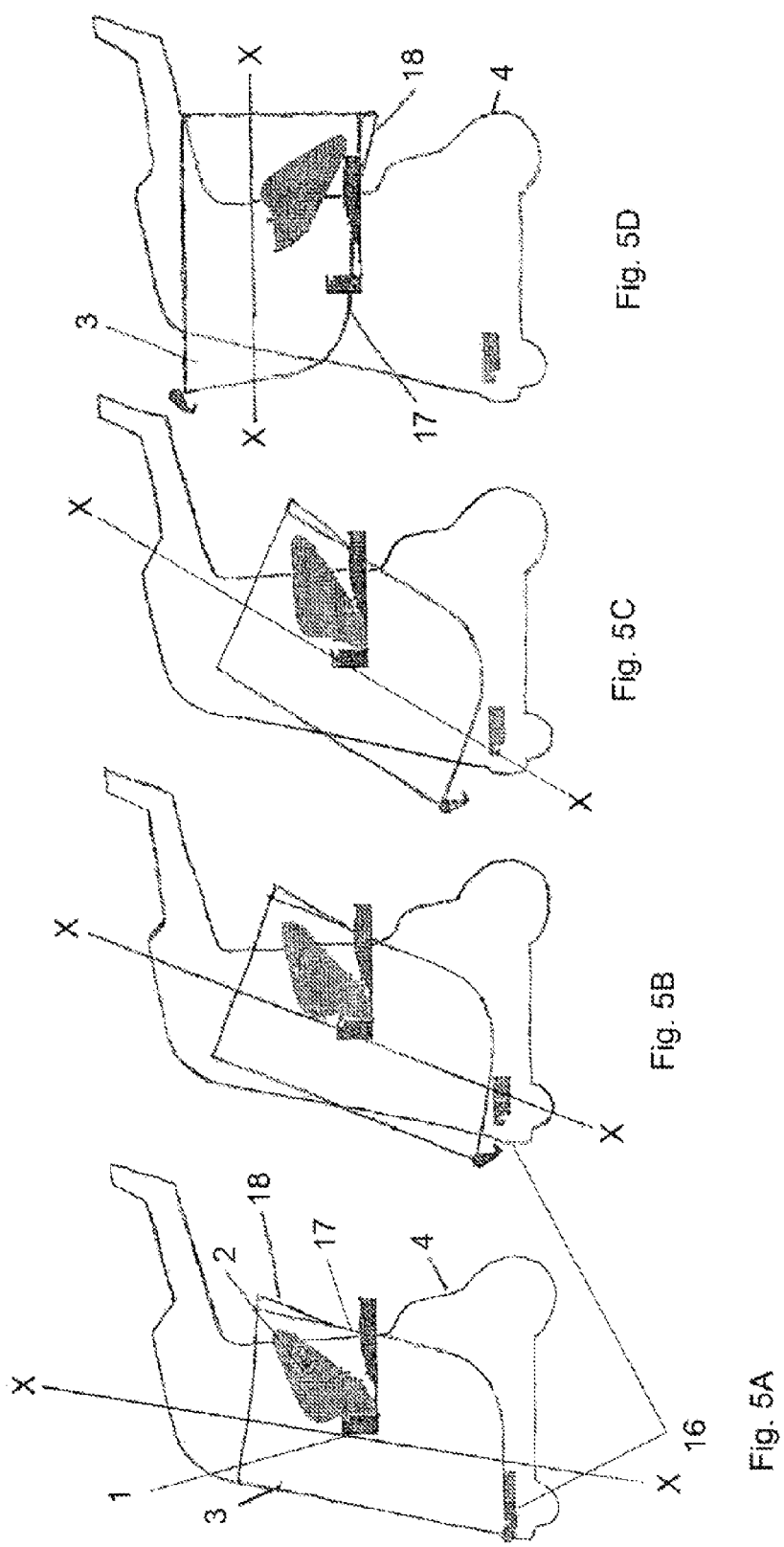

TIPPING ARRANGEMENT OF A MOVABLE CLEANING UNIT

CROSS REFERENCE TO RELATED APPLICATIONS

This application is a National Stage of PCT International application no. PCT/DK2012/000123, filed 20 Nov. 2012, which claims priority in Danish Patent Application no. PA 2011 00911 filed 21 Nov. 2011, the contents of these applications being hereby incorporated by reference.

TECHNICAL FIELD

The present invention relates to a tipping arrangement for movable units, such as movable cleaning units, having a movable base unit and a rotatable container, wherein the tipping arrangement is configured to be connected to the base unit and the container so that the container may rotate around the tipping arrangement.

The present invention also relates to a movable unit, such as a movable cleaning unit, comprising a movable base unit and a rotatable container configured to be positioned on the base unit.

The present invention furthermore relates to a tipping method for movable units, such as movable cleaning units, having a movable base unit and a rotatable container connected to the base unit by a tipping arrangement.

PRIOR ART

Today cleaners, such as vacuum cleaners, wet cleaners or combined wet and dry cleaners, comprise a container for storing the collected fluid, debris and/or particles mounted on a movable base unit or support structure. The container has an open end to which a suction unit with a motor and a fan is fixed. The suction unit is fixed to the container by a number of locking elements located on either the container or the suction unit, so that the suction unit creates a seal around the open end. During normal operation, the suction unit uses a suction hose with a nozzle to collect the fluids, debris and/or particles, which are then transferred to the container for storage. When the container is full, the suction hose and locking elements are disengaged and the suction unit is removed. The container (and the base unit or support structure) then has to be lifted up and pivoted in order to empty the container, i.e. into a bag or another container. This often requires the user to apply a mount of force in order to lift the container, and requires the user to assume an awkward lifting position.

Some cleaners, such as the model Attix 965 from the applicant, have a structure which improves the emptying process. In this embodiment, the container is lowered to the ground and then removed from the support structure before being emptied. This structure has integrated support elements, which is used to lift the container in order to avoid any awkward lifting positions. A similar structure is disclosed in CH 688734 A5, where the container is lowered to the ground by rotating the handle, so that the container may be moved away. However these structures still require the container to be lifted up in order to empty the container.

Other cleaners, such as the models Attix 7 or Maxxi WD from the applicant, have a structure which further improves the emptying process. The container is pivotally mounted to the base unit or the support structure, so that the container may be emptied by pivoting the container around a pivot point. These structures do not require the container to be lifted in order to empty the container. However, the user has to apply a large amount of force at the beginning in order to pivot the container until the contents start pouring out. U.S. Pat. No. 5,979,014 A discloses a fluid spring connected to a lifting lever used to reduce the lifting force needed at the beginning. Furthermore, these structures require the base unit and mounting structure to be very sturdy in order to carry the weight of a fully loaded container. If the base unit is not able to properly act as a counterweight for the container during the emptying process, the user needs to support the base unit when pivoting the container.

EP 1792558 A2 discloses a liquid vacuum cleaner having a tank pivotally mounted to the base unit, where the tank may be emptied by pivoting the tank around a pivot point, which is positioned so that the centre of gravity of the tank and the liquid therein remain between the wheel axles. The user still has to apply a large amount of force at the beginning in order to pivot the container until the contents start pouring out. Furthermore, the base unit still has to have a sturdy structure in order to carry the weight of a fully loaded container.

WO 91/11952A1 discloses an alternative embodiment of a vacuum cleaner having a support structure pivotally mounted to a pivot point on the container. During emptying, the support structure is rotated so that the lower end contacts the ground, the user then supports the structure while rotating the container around the pivot point. The drawback of this structure is that the user still has to apply a large amount of force at the beginning in order to rotate the container until the contents start pouring out. The support structure has to be very sturdy so that the structure does not collapse when rotating a fully loaded container.

THE OBJECT OF THE INVENTION

The present invention remedies the drawbacks of the most immediate prior art by providing a movable cleaning unit having a tipping arrangement comprising a movable base unit and a rotatable container comprising a bottom and a at least one side wall and a pouring lip in the upper part of the sidewall, characterized by comprising a first element configured to act as a track element for a second element, which is configured to move along the first element thereby allowing the container to rotate to a position in which the part of the sidewall comprising the pouring lip is substantially horizontal.

The moveable cleaning unit is highly suitable for handling liquids due to the container having a pouring lip in the upper part of the sidewall. That the container may comprise at least one sidewall is to be understood as if the side wall has e.g. a circular or oval cross section, then you may say the container has only one side wall. If the cross section e.g. is square or rectangular then you may say that the container has four side walls. The pouring tip is located In the part of the side wall which will be the lower part of the container when the container is rotated, Thus, when the container is fully rotated this lower part of the side wall will be in a substantially horizontal position allowing liquid to run out from the container via the pouring lip. The term "substantially horizontal position" is to be construed as the lower part of the side wall may deviate from horizontal with about 10 degrees; preferably 5 degrees.

The combination of the container comprising a pouring lip and the rotation of the container makes it possible to pour liquid from the container with a high degree of precision. Thus, it is possible to pour liquid from the container into a small opening, such as an opening for a sewer.

The first element comprises a first track configured to contact a second track on the second element, and the second element is rotated relative to the first element, so that second element moves along the first track on the first element during the rotation. The second element is positioned at an angle relative to the first element, and the contact area between the two tracks is moved along the first track during the rotation of the second element. This provides a tipping arrangement where the second element is moved (rolled) along the track on the first element, thus rotating the second element relative to the first element, which will rotate the container relative to the base unit. This means that the force needed to rotate the container may be significantly reduced in particular at the beginning of the emptying process, which also provides a more stable tipping arrangement for the container.

A number of engaging female and male parts are arranged on the first track and on the second track, respectively. This prevents the second element from sliding on the track on the first element, when moving the second element along the track.

The shape of the second track is determined according to a number of positions of a centre of gravity for the container and the contents contained therein during the rotation of the container. At least one of the tracks on the elements has a planar, a curved or a wave shaped surface having a crest and/or a trough. This provides a tipping arrangement, where the pivot point is constantly shifted towards the centre of gravity during the emptying process.

The tipping arrangement comprises an interlocking arrangement configured to hold the second element to the first element when the second element is positioned in a starting position. This enables the base unit and the container to be lifted together when the container is not rotated.

The present invention also remedies the drawbacks of the most immediate prior art by providing a movable unit, wherein the unit comprises a tipping arrangement, as described above, arranged between the base unit and the container. This provides a more stable tipping arrangement for the container during the emptying process. The sides of the base unit may be manufactured with less strength and a smaller amount of material.

The base unit comprises a locking arrangement configured to lock the container in a vertical position. The locking arrangement comprises a release mechanism or a lifting arrangement configured to unlock the container from its locked position. This prevents the container from pivoting during normal operation of the unit.

The unit comprises a suction unit configured to be placed on an open top end of the container and locked to the container by a number of locking elements. This enables the unit to perform a desired cleaning operation by using a suction hose with a nozzle.

The present invention furthermore remedies the drawbacks of the most immediate prior art by providing a tipping method, characterized in that the tipping method comprises the steps of moving a second element along a first element acting as a track element for the second element while rotating the container. Both elements comprise a track contacting each other, and the second element moves along the first element by rotating the second element relative to the first element, so that a contact area between the tracks moves along the track on the first element during the rotation. This enables the second element to be moved (rolled) along the track on the first element, thus rotating the second element relative to the first element, which will rotate the container relative to the base unit. This means that the force needed to rotate the container may be significantly reduced in particular at the beginning of the emptying process, which also provides a more stable tipping arrangement for the container.

The contact area, i.e. the pivot point, between the two tracks is constantly shifted towards the centre of gravity of the container and the contents contained therein during the rotation of the container. This provides a tipping arrangement where the pivot point is constantly shifted towards the centre of gravity during the emptying process.

The second element moves along the first element by using a number of engaging female and male parts arranged on the tracks, respectively. This prevents the second element from sliding on the track on the first element, when moving the second element along the track.

The second element is interlocked to the first element when the container is rotated into a vertical position. This enables the base unit and the container to be lifted together when the container is not rotated.

The container is locked to the base unit when positioned in a vertical position, and unlocked before performing the tipping steps. This prevents the container from pivoting during normal operation of the unit.

BRIEF DESCRIPTION OF THE DRAWINGS

The embodiments of the invention will now be described with reference to the drawings, in which FIG. 2 shows the container placed in a starting position of the emptying process, FIG. 3 shows the container placed in a intermediate position of the emptying process, and FIG. 4 shows the container placed in a stop position of the emptying process before returning to the starting position, FIG. 5 shows the principles of the tipping arrangement according to the invention.

DESCRIPTION OF THE EXEMPLARY EMBODIMENTS

Figure 1:
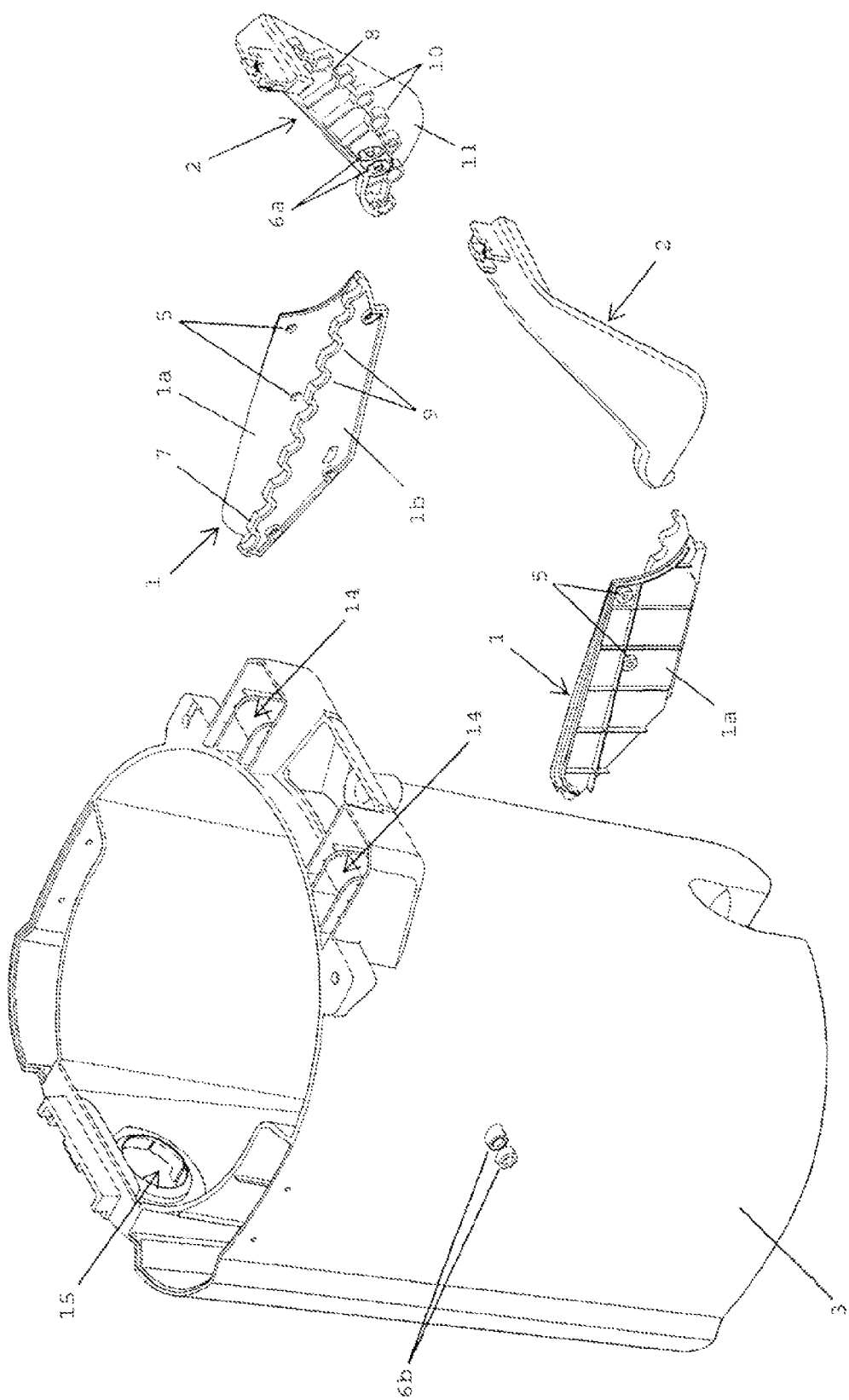
FIG. 1 shows an exploded embodiment of the tipping arrangement.

FIG. 1 shows an exploded embodiment of the tipping arrangement according to the invention. The tipping arrangement comprises a first element 1 configured to act as a track element for a second element 2, which is configured to act as a pivot element for a container 3. The first element 1 is connected to a base unit 4 in which the container 3 may be positioned. The first element 1 may be mounted or fastened to the base unit 4 by known mounting or fastening means, i.e. screws, bolts, snap fasteners, press fit arrangements or other means. The first element 1 may comprise one or more, i.e. two, through holes 5 for mounting or fastening the element 1 to the base unit 4. The second element 2 may be mounted or fastened to the container 3 by known mounting or fastening means, i.e. screws, bolts, snap fasteners, press fit arrangements or other means. The second element 2 may comprise one or more, i.e. two, press fit arrangements 6 having a male part 6a and a female part 6b located on the container 3 and the second element 2, respectively. The first element 1, i.e. the through holes 5, and the second element 2, i.e. the female part 6b, may be positioned at a predetermined position on the container 3 and on the base unit 4 according to the dimensions of the container 3.

The first element 1 comprises a track 7 configured to contact another track 8 on the second element 2. The track 7 may extend in the longitudinal direction of the first element 1, as shown in FIG. 1. The track 7 may have a planar, a curved or wave shaped surface which may comprise a crest and/or a trough. The shape of the track 7 may be determined according to the outer shape of the second element 2, i.e. the shape of the track 8. The track 8 may extend in the longitudinal direction of the second element 2, as shown in FIG. 1. The track 8 may have a planar, a curved or wave shaped surface which may comprise a crest and/or a trough. The shape of the track 8 may be determined according to the dimensions of the container 3, and may differ from the shape of the track 7, i.e. have an inclination which is steeper than the inclination on the track 7. The second element 2 is positioned at an angle relative to the first element 1, so that only a portion of the track 8 contacts the track 7, as shown in FIGS. 2-4. This enables the track 8 on second element 2 to be moved (rolled) along the track 7, which means that the contact area between the two tracks 7, 8 moves from one end of the track 7 towards the other end during the movement, as shown in FIGS. 2-4, thus rotating the second element 2 relative to the first element 1. This in turns rotates the container 3 relative the base unit 4, as indicated on FIGS. 2-4, so that the container 3 may be emptied.

A number of engaging female and male parts may be arranged on the tracks 7, 8, respectively. The female parts may be distributed throughout the length of the track 7, and are configured to engage a corresponding number of male parts on the track 8, or vice versa. The female parts may be configured as recesses 9, while the male parts may be configures as taps 10, as shown in FIG. 1. The female and male parts are used to move the second element 2 along the track 7, while preventing the second element 2 from sliding on the track 6 when rotating the container 3.

The second element 2 may comprise a stabilizing flap 11 extending away from the track 8, as shown in FIG. 1. The stabilizing flap 11 may be positioned between a first part 1a and a second part 1b of the first element 1, when the second element 2 is positioned on the first element 1. The through holes 5 may be arranged on the first part 1a which may be configured to lie against the base unit 4. The track 7 may be arranged on the second part 1b, which is connected to the first part 1a via an intermediate part (not shown). The flap 11 stabilizes the second element 2 relative to the first element 1 during the rotation, so that the two tracks 7, 8 always contact each other, thus preventing the track 8 from sliding off the track 7. The configuration of the flap 11 also enables the container 3 to return more quickly to its starting position, i.e. the upright (vertical) position.

The first element 1 may comprise an interlocking arrangement (not shown) configured to hold the second element 2 to the first element 1, when the container 3 is positioned in a vertical position. The interlocking arrangement may comprise a female part and a male part positioned on the two elements 1, 2, respectively. The female part may be configured as a recess configured to hold and receive the male part, which may be configured as a tap. The first element 1 may comprise a third part (not shown) extending away from the track 7, on which the female part or the male part may be arranged. The second element 2 may comprise a part (not shown) extending in the opposite direction of the flap 11, on which the male part or the female part may be arranged. This enables the second element 2 to be secured to the first element 1 when the container 3 is not rotated, which means that the base unit 4 and the container 3 may be lifted together. The container 3 may be removed from the base unit 4 by moving the second element 2 along the track 7, until the female and the male part are disengaged.

The base unit 4 may comprise one or more wheels 12 and a steering arrangement 13, i.e. a handle bar, so that the base unit 4 may be moved by a user. The base unit 4 may preferably comprise a base connected to two upwardly extending sides, which are interconnected at the top by the steering arrangement 13, as indicated on FIGS. 2-4. The first element 1 may be connected to each side of the base unit 4 and the second element 2 may be connected to the container 3 at opposite side, as indicated on FIG. 1. This enables the container 3 to be suspended from the tipping arrangements.

The base unit 4 may comprise a locking arrangement (not shown) configured to lock the container in its vertical position during normal operation. The locking arrangement may comprise two engaging parts positioned on the base of the base unit 4 and on or near the bottom of the container 3. The engaging part on the base may comprise a release mechanism which may be activated by the user. When the container is positioned in its vertical position, the user may use the release mechanism to lock the container in its position. The engaging part on the base may comprise a lifting arrangement, i.e. a lifting lever or a lifting handle, used when rotating the container 3, which, when activated, unlocks the container. The locking arrangement may alternatively be configured to automatically lock the container 3 in its position when the container 3 is positioned in the vertical position. This prevents the container 3 from pivoting during normal operation of the unit.

A suction unit (not shown) may be locked to the open top end of the container, as indicated on FIG. 1. The container 3 may comprise one or more locking elements arranged at or near the top end, which may be used to lock the suction unit to the top of the container 3. The locking elements may comprise a release mechanism engaging the suction unit, so that the suction unit may be released from the container 3 and removed. The release mechanism may alternatively be placed on the suction unit and engage the locking elements. The container 3 may comprise a pivot arrangement 14 arranged at the top end to which the suction unit may be connected, so that the suction unit may pivoted relative to top end of the container 3. The suction unit may comprise a motor and a fan which are used to suck up fluids, debris and/or particles, which are then transferred to the container 3 for storage via a suction hose (not shown) connected to an inlet 15 on the container 3. The suction unit may comprise a flexible sealing element configured to engage the edge at the top end, so that it creates a seal between the container 3 and the suction unit during normal operation. The suction unit, the base unit 4 and the container 3 are configured to form a movable cleaning unit configured to perform a desired cleaning function.

Before starting the emptying process the suction unit and the suction hose are removed, as shown on FIG. 2, and the base unit 4 is positioned near an external unit, i.e. a toilet, a vessel or another unit. The suction unit may alternatively be pivoted around the pivot arrangement instead. The locking arrangement on the base unit 4 may then be activated to unlock the container 3, so that the container 3 may be emptied. The user then rotates the container 3, i.e. moving the second element 2 along the track 7 on the first element 1, in order to empty the container 3, i.e. via a spout on the container 3, as shown on FIG. 3. The user continuous to rotate the container 3, until the container 3 is empty and/or until the second element 2 reaches the end of the track 7, i.e. the stop position, as shown on FIG. 4.

During the rotation the centre of gravity for the container 3 and its contents shifts at the same time as the mass of the container 3 (and its contents) is reduced. By moving the second element 2 along the track 7 on the first element 1 as described, the pivot point (the contact area between the two tracks 7, 8 on the elements 1, 2) is constantly shifted towards the centre of gravity during the emptying process. This means that the force needed to rotate the container 3 may be significantly reduced in particular at the beginning of the emptying process. The invention provides a more stable tipping arrangement for the container 3 during the emptying process. The sides of the base unit 4 may be furthermore manufactured with less strength and a smaller amount of material.

The shape of the track 8 and optionally the shape of the track 7 may be determined according to the shape and dimensions of different containers, so that the tipping arrangement may be adapted to different types of containers. The first element 1 and the second element 2 may be made of plastic, metal, or the same material as the container 3 and/or the base unit 4.

FIG. 5 is only schematically and shows the principles of the tipping arrangement. FIG. 5A shows the first element 1 and the second element 2 in a position where the container 3 is not rotated in respect of the base unit 4. A locking mechanism 16 to lock the container 3 in respect of the base unit 4 is indicated in the figure.

Moreover a line XX is drawn through the container 3. This line XX may be considered a symmetry line in respect of the wall of the container 3. The line XX is parallel to the wall part 17 comprising the pouring lip 18.

In FIG. 5B the locking mechanism 16 has been released and a rotation of the container 3 has been initiated. In FIG. 5C the container 3 is rotated even more. As it can be seen the part of the wall comprising the pouring lip moves as indicated by line XX.

In FIG. 5D the container 3 is fully rotated in respect of the base unit 4. In this position the wall part 17 is in a substantially horizontal position as indicated by line XX. In this position liquid may easy be poured out of the container via the pouring lip 18.

Moreover, the rotation of the container 3 controlled by the elements 1 and 2 ensures that a beam of liquid leaving the container 3 via the pouring lip 18 can be controlled to hit substantially the same spot, e.g. an opening for the sewer.

The invention claimed is:

1. A movable vacuum cleaning unit for cleaning up one or more of liquids, fluids, debris and particles, said movable cleaning unit comprising:
 a movable base unit and a rotatable container having a container bottom, at least one container sidewall, and a container inlet for a suction hose through which container inlet the one or more of liquids, fluids, debris and particles are transferred to become contents of the rotatable container, the rotatable container having a center of gravity inside the rotatable container at a certain height above the container bottom;
 a tipping arrangement configured for connection to the movable base unit and to the rotatable container such that the rotatable container is manually rotatable around the tipping arrangement so that when emptying the contents of the container during a manual emptying rotation of the rotatable container from a substantially vertical, first position on the movable base unit to a substantially horizontal second position on the movable base unit a combined center of gravity of the rotatable container and the contents of the rotatable container shifts as a combined mass of the rotatable container and the contents of the rotatable container is reduced,
 the at least one container sidewall having a pouring lip on an upper part thereof,
 the tipping arrangement having a first element comprising a first track configured to contact a second track on a second element of the tipping arrangement in a contact area between the first track and the second track that moves during the manual emptying rotation of the rotatable container starting from the first position with the first element and the second element connected at a vertical height from the bottom of the container substantially corresponding to the height of the center of gravity of the rotatable container in the first position, the second element being movable from the first position of the rotatable container along the first track during the manual emptying rotation to the second position of the rotatable container as the contact area between the first track and the second track comprising a pivot point is shifted towards the combined center of gravity of the rotatable container and the contents of the rotatable container as the combined center of gravity shifts during the manual emptying rotation ending with the upper part of the container sidewall including the pouring lip oriented substantially vertically in the second position, the second element being rotatable relative to the first element such that the second element is movable along the first track for allowing the container to rotate in a direction opposite the manual emptying rotation starting from the second position to the first position in which the upper part of the container sidewall including the pouring lip is oriented substantially horizontally with the rotatable container in the substantially vertical, first position on the movable base unit.

2. The movable vacuum cleaning unit according to claim 1, wherein the second element includes a stabilizing flap.

3. The movable vacuum cleaning unit according to claim 2, wherein the second element is angled relative to the first element, the contact area between the two tracks being moved along the first track during rotation of the second element.

4. The movable vacuum cleaning unit according to claim 1, wherein a shape of the second track is determined according to a number of positions of the center of gravity of the rotatable container and the contents of the rotatable container during the rotation of the rotatable container.

5. The movable vacuum cleaning unit according to claim 4, wherein one or both of the first track and the second track has or have at least one of a planar surface, a curved surface and a wave shaped surface having a crest and a trough.

6. The movable vacuum cleaning unit according to claim 1, wherein the tipping arrangement further comprises an interlocking arrangement configured to hold the second element to the first element when the second element is in the first position.

7. The movable vacuum cleaning unit according to claim 1, wherein the base unit comprises a steering arrangement for manually moving the vacuum cleaning unit.

8. The movable vacuum cleaning unit according to claim 1, wherein a number of engaging female and male parts are arranged on the first track and on the second track respectively.

9. A movable vacuum cleaning unit comprising:
 a movable base unit;
 a rotatable container positioned on the base unit having a container inlet for a suction hose through which container inlet vacuumed contents are transferred in a substantially vertical, first position of the rotatable container; and, a tipping arrangement arranged between the base unit and the rotatable container, the tipping arrangement configured for connection to the base unit and to the rotatable container at a vertical height from a bottom of the rotatable container substantially corresponding to a center of gravity of the rotatable container in the first position, such that the rotatable container is manually rotatable around the tipping arrangement, the rotatable container having a pouring lip on an upper part of a sidewall thereof, the tipping arrangement having a first element configured as a track element, a second element configured to move along the first element, the first element having a first track including a number of engaging male or female parts configured to contact a second track of the second element, the second track including a number of respective engaging female or male parts, the second element being rotatable relative to the first element, such that the second element is movable along the first track for allowing the container to rotate from the first position in which the part of the sidewall including the pouring lip is substantially horizontal to a second position in which the part of the sidewall including the pouring lip is substantially vertical, the second element being movable along the first track during manual rotation of the container to the second position such that when emptying the vacuumed contents of the rotatable container during an emptying rotation of the rotatable container from the first position to the second position a combined center of gravity of the rotatable container and the vacuumed contents of the rotatable container shifts as a combined mass of the rotatable container and the vacuumed contents of the rotatable container is reduced during the emptying.

10. The movable vacuum cleaning unit according to claim 9, wherein the base unit further comprises a locking arrangement configured to lock the container in the first position and having an arrangement configured to unlock the container.

11. The movable vacuum cleaning unit according to claim 9, wherein the base unit comprises a steering arrangement for manually moving the vacuum cleaning unit.

12. The movable vacuum cleaning unit according to claim 9, wherein the female parts and the male parts are substantially disengaged in the second position.

* * * * *